Patented July 31, 1928.

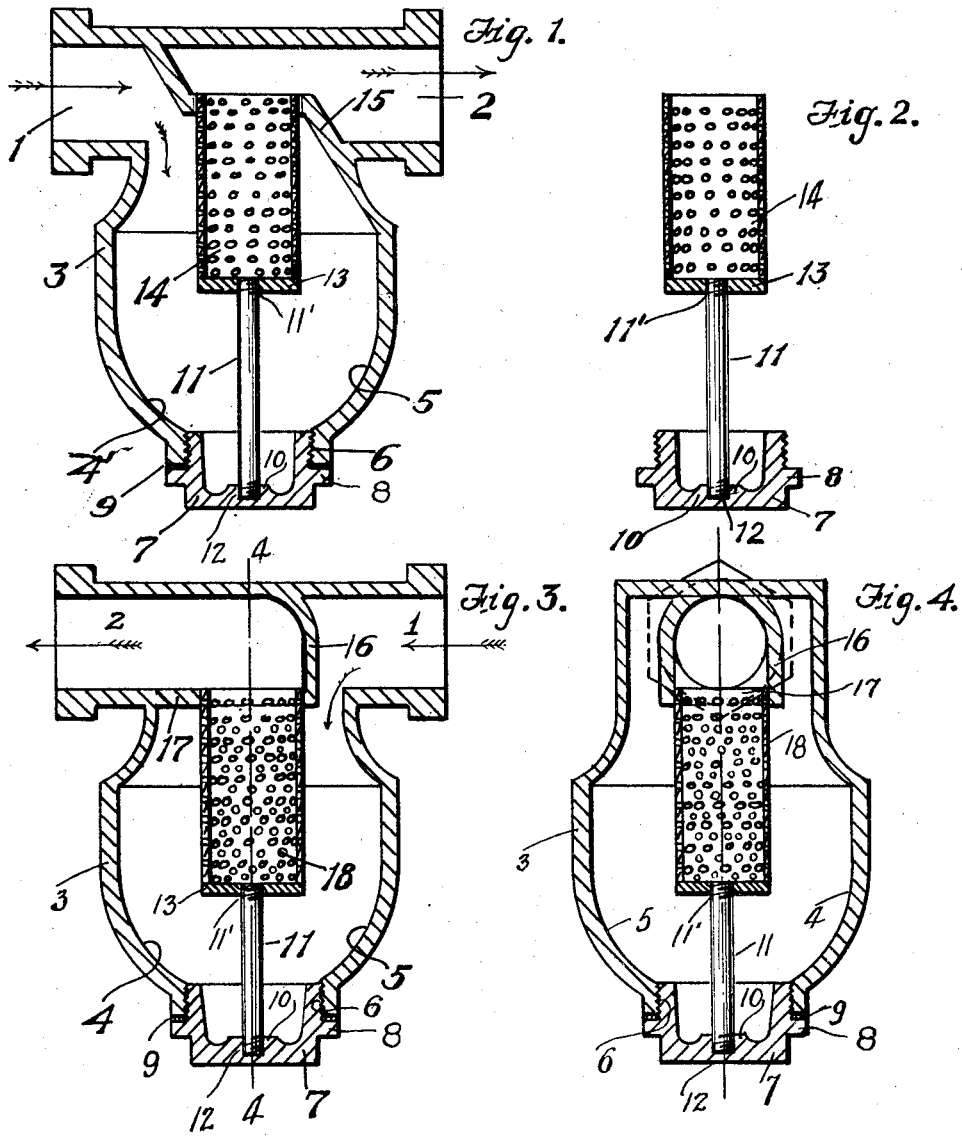

1,679,033

UNITED STATES PATENT OFFICE.

FREDERICK M. HOLMES, OF SPRINGFIELD, MASSACHUSETTS, ASSIGNOR TO TRYCO PRODUCTS, INC., OF WESTFIELD, MASSACHUSETTS, A CORPORATION OF MASSACHUSETTS.

STRAINER.

Application filed November 5, 1923. Serial No. 672,803.

This invention relates to improvements in screens or strainers for air, gas or liquids, particularly water.

An object of the invention is to provide a strainer for use in pipes through which flows air, gas or liquids. The device is particularly designed for entrapping any foreign substances which are present in such pipes, as particles of iron rust or scale, sand, or other substances which will interfere with the proper operation of pipe fittings.

A further object is to provide a shell or casing for supporting the screen or strainer so that it may be readily and easily inserted and removed from the shell or casing.

A further object is to provide a shell or casing that may be readily cleaned when the screen is removed.

A further object is to locate and arrange the screen in the shell whereby the entire surface of the screen may be utilized.

These and other objects will appear in the body of the specifications and will be specifically pointed out in the claims.

Referring to the drawings:

Fig. 1 is a vertical sectional view on a vertical plane passing through the axis of the inlet and outlet openings.

Fig. 2 is a detail view of the screen and closure cap removed from the casing, as a unit, Fig. 3 is a sectional view of a modification of the interior construction and arrangement of the screen, and Fig. 4 is a sectional view of Fig. 3 on the line 4—4.

Referring to the drawings in detail:

1 designates the inlet end and 2 the outlet end of the casing, 3 the body part of the casing formed with the curved inner surfaces 4 and 5, which terminate in the threaded opening 6, which is closed with the threaded cap 7 which is formed with the annular flange 8 on which is placed the fibre packing ring 9.

Attached to the upwardly extended boss 10 is a rod 11, the lower end of which is threaded into the threaded opening 12 of the boss. The upper end of the rod is also threaded at 11′ for attaching a disk or plate 13 thereto. Secured to this disk is a cylindrical shaped screen or strainer 14 which is formed from a sheet of thin material, as brass, and perforated with a large number of small holes, or it may be formed from a strip of wire cloth of any suitable mesh. The upper end of the screen, or strainer, closely fits into a circular opening in the horizontal part of the bridge piece 15. It is assembled by simply threading the cap into the threaded opening 6. It is removed as a unit with the cap 7 by simply unthreading the cap from the opening 6 as shown in Fig. 2.

It is apparent that the entire outer surface of the screen is effective in collecting any foreign substances. It is also apparent that any surplus material not collected by the screen will collect in the lower part of the casing 3 and can be readily removed by removing the cap 7, when the interior may be cleaned. It should be particularly observed that the interior is smooth and free from any obstruction which would serve to collect foreign substances.

Referring to the modification shown in Fig. 3. The position of the screen member 14, shown in Fig. 1 is changed and in its place is the curved deflector member 16 which is formed integral with the horizontal or floor part 17, causing the outgoing fluid to flow into the upper open end of the strainer 18. This screen or strainer like the screen or strainer 14 is attached to the rod 11 whereby it may be removed for the purpose of cleaning the strainer and interior walls of the casing. In this construction the incoming fluid engages the outside of the screen and the whole outer surface of the screen is effective in removing the foreign substances that is carried against the strainer with the fluid.

It should be particularly observed that the area or surface of the strainer, or screen, is very much greater than the area of the inlet passage 1, whereby any foreign substances in the water, or other liquid, is thoroughly removed.

A further important feature is that the interior of the casing 3 may be thoroughly flushed out or cleansed of any foreign substances when the cap 7 is removed and the water is allowed to enter through the inlet passage 1. These substances will be carried downward through the opening 6, and at the same time the inner surface of the casing 3 is thoroughly cleansed since there are no projections or other obstructions, it will be observed, to collect and retain any foreign substances.

What I claim is:

1. A cylindrical strainer device for fluids comprising a casing member having an inlet and outlet passage, a wall or bridge piece in the casing and having a horizontal part that is formed with an opening, a strainer having its upper end open and said upper end only being located in the opening and flush with the said horizontal part, a closure plate attached to the lower end of the strainer, a closure cap for the lower end of the casing, a rod secured to the cap and to the said plate on the lower end of the strainer at its upper end for removing the strainer when the cap is removed, the construction and arrangement being such that the incoming fluid passes from the outside through the openings in the side of the strainer to the inside of the strainer and to the open outer end of the strainer and outlet passage whereby the entire outer surface of the strainer is thereby utilized.

2. A cylindrical strainer device for fluids comprising a casing member, having an inlet and an outlet passage, a horizontal wall or bridge piece in the casing and formed with an opening, a strainer having its upper end open and located in the opening of the bridge piece and its lower end closed, a closure cap located at the bottom of the casing, a rod secured to the cap at its lower end and to the closed bottom of the strainer at its upper end for removing the strainer when the cap is removed, the construction and arrangement being such that the incoming fluid passes from the outside to and downward to the inside of the strainer to the outlet passage of the casing and whereby the entire outer surface of the strainer is utilized, said casing having the lower inner surfaces of its walls formed smooth or without any obstruction, as described.

3. A device to be placed in a pipe line for straining fluids while the latter passes through said line, said device comprising a casing having an inlet passageway and an outlet passageway, a bridge piece in the casing dividing the interior of the same into a lower chamber communicating with the inlet passageway, and an upper chamber communicating with the outlet passageway, said bridge piece having a horizontal portion formed with an opening therethrough, a cylindrical tubular strainer arranged in the lower chamber, having its upper end open and extending into the opening in the bridge piece, said strainer depending from the bridge piece, an imperforate plate closing the lower end of said strainer, an inverted closure cap for the lower end of the casing, a rod rigidly connected to the cap and to said plate for removing the strainer when the cap is removed, the construction and arrangement being such that the incoming fluid passes into the lower chamber and then into the strainer from all sides of the latter, and finally up the strainer through its open end to the outlet passageway, whereby the entire outer surface of the strainer is utilized and washed by the incoming fluid.

FREDERICK M. HOLMES.